US008666650B2

(12) United States Patent
Mutuel et al.

(10) Patent No.: US 8,666,650 B2
(45) Date of Patent: Mar. 4, 2014

(54) METHOD AND DEVICE FOR ASSISTING IN THE LOCATING OF AIRCRAFT

(75) Inventors: Laurence Mutuel, Tournefeuille (FR); Benoît Couturier, Goyrans (FR)

(73) Assignee: Thales, Neuilly sur Seine (FR)

( * ) Notice: Subject to any disclaimer, the term of this patent is extended or adjusted under 35 U.S.C. 154(b) by 415 days.

(21) Appl. No.: 13/052,916

(22) Filed: Mar. 21, 2011

(65) Prior Publication Data

US 2012/0072101 A1 Mar. 22, 2012

(30) Foreign Application Priority Data

Mar. 23, 2010 (FR) .................................... 10 01149

(51) Int. Cl.
*G06F 17/00* (2006.01)

(52) U.S. Cl.
USPC ............ 701/300; 701/301; 701/120; 701/409

(58) Field of Classification Search
USPC ......... 701/2, 3, 4, 15, 17, 300, 301, 408, 409, 701/445, 468, 492, 120
See application file for complete search history.

(56) References Cited

U.S. PATENT DOCUMENTS 5,974,349 A 10/1999 Levine
6,799,094 B1 9/2004 Vaida et al.
7,203,630 B2 * 4/2007 Kolb et al. ........................ 703/6
7,457,690 B2 * 11/2008 Wilson et al. ..................... 701/3
7,460,866 B2 * 12/2008 Salkini et al. ................ 455/431

FOREIGN PATENT DOCUMENTS

DE 10 2008 026 415 A1 12/2009
WO 2009/112112 A1 9/2009

OTHER PUBLICATIONS

Ho Dac Tu, et al., "A Proposal of Relaying Data in Aeronautical Communication for Oceanic Flight Routes Employing Mobile Ad-Hoc Network", First Asian Conference on Intelligent Information and Database Systems , Apr. 1, 2009, pp. 436-441, IEEE, Piscataway, NJ, USA, XP031498017.

* cited by examiner

*Primary Examiner* — Richard Camby
(74) *Attorney, Agent, or Firm* — Baker & Hostetler LLP

(57) ABSTRACT

A method for assisting in the locating of a first aircraft includes a step of emission by the first aircraft of an identifier and of a time-stamped position reading, said method further including: the reception and the storage by at least one second aircraft of the identifier and of the time-stamped position reading, and the downloading by the second aircraft, after its landing, of the identifiers and of the time-stamped position readings to a database on the ground, and, in case of disappearance of the first aircraft, the determination of the last known position of the first aircraft based on the time-stamped position readings stored in the database on the ground.

7 Claims, 3 Drawing Sheets

METHOD AND DEVICE FOR ASSISTING IN THE LOCATING OF AIRCRAFT

CROSS-REFERENCE TO RELATED APPLICATION

This application claims priority to foreign French patent application No. FR 1001149, filed on Mar. 23, 2010, the disclosure of which is incorporated by reference in its entirety.

TECHNICAL FIELD

The invention relates to the locating of aircraft and, more particularly, support in searching for aircraft that have disappeared.

BACKGROUND

During the flight by an aircraft over an area with no radar coverage, such as an ocean region, the aircraft makes position reports intended for an air traffic controller located on the ground or the airline operations centre. These position reports, indicating the position of the aircraft at a given instant, are made by HF link or satellite link and are infrequent.

Currently, the reporting of aircraft positions in ocean regions is inadequate; the crash of Air France flight 447 in the Atlantic is an example of the situation to be improved to enable rescue teams to more easily find the last position of the aircraft and not that dating from a few hours before the accident. It is also known that accidents in continental regions outside of radar coverage are fairly frequent in the United States and in Africa.

When an aircraft in a transoceanic flight or in regions without radar coverage disappears, the older the last aircraft position report is, the more time is lost by the search teams in finding its last location. This observation is equally valid in the case of a crash and in the case of a diverted aircraft if the transponder has been switched off or damaged. In these aircraft search situations, time is a critical factor for the victims and for the recovery of the black boxes.

The invention aims to mitigate the abovementioned problems by proposing a method and a device that make it possible to improve the locating of aircraft that have disappeared. The invention makes it possible to extend the knowledge of the location of an aircraft in areas with no radar coverage by using the aircraft in its vicinity to record position reports. This information is then downloaded upon the arrival of the aircraft. If an aircraft disappears (crash, diversion), it is then possible to retrace its trajectory for a longer time than with conventional position reports.

SUMMARY OF THE INVENTION

To this end, the subject of the invention is a method for assisting in the locating of a first aircraft comprising a step of emission by the first aircraft of an identifier and of a time-stamped position reading, said method being characterized in that it comprises:

- the reception and the storage by at least one second aircraft of the identifier and of the time-stamped position reading, and
- the downloading by the second aircraft, after its landing, of the identifiers and of the time-stamped position readings to a database on the ground,
- in case of disappearance of the first aircraft, the determination of the last known position of the first aircraft based on the time-stamped position readings stored in the database on the ground.

The invention also relates to a device for assisting in the locating of a first aircraft comprising means, onboard the first aircraft, of emitting an identifier and a time-stamped position reading, said device being characterized in that it comprises:

- means for the reception and means for the storage, onboard a second aircraft, of the identifier and of the time-stamped position reading, and
- means for the downloading by the second aircraft, after its landing, of the identifiers and of the time-stamped position readings to a database on the ground,
- means for determining the last known position of the first aircraft, in case of disappearance of said first aircraft, on the basis of the time-stamped position readings stored in the database on the ground.

This solution has the advantage of reducing the time spent in searching for the nearest position of the aircraft before its disappearance and therefore allowing for a faster locating of the debris, black boxes and victims.

The invention also has the advantage of being easy to implement because it partly uses means present onboard aircraft.

BRIEF DESCRIPTION OF THE DRAWINGS

The invention will be better understood and other advantages will become apparent from reading the detailed description given as a nonlimiting example and with the help of the figures in which.

DETAILED DESCRIPTION

Currently, aircraft make inadequate position reports during transoceanic flights and, in case of a crash for example, precious time is spent in trying to find the position of the aircraft as close as possible to the accident region.

Although these regions do not benefit from adequate radar coverage, an aircraft is not alone on the air routes and other aircraft on the uplink or downlink are within range to establish a communication by digital links to exchange, for example, identification and position information.

Such information can be stored in a database onboard each aircraft, the content of which can be downloaded on arrival. By cross-checking between the data downloaded from all these aircraft, the trajectory of each aircraft can be reconstructed with a very frequent refresh rate in case of a request from the authorities.

Figure 1:
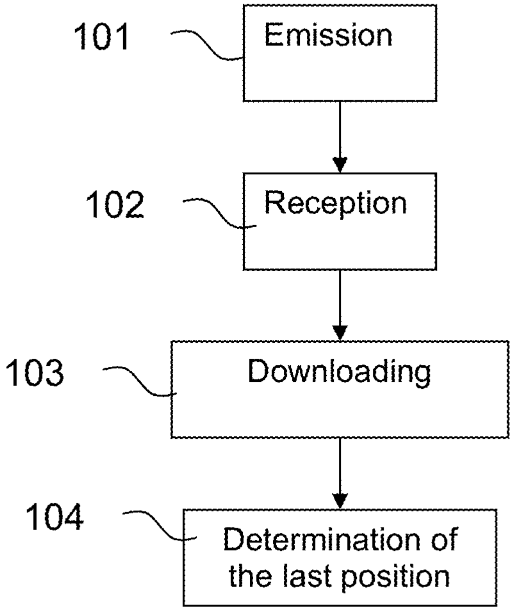
FIG. 1 represents a diagram of the method according to the invention.
Figure 2:
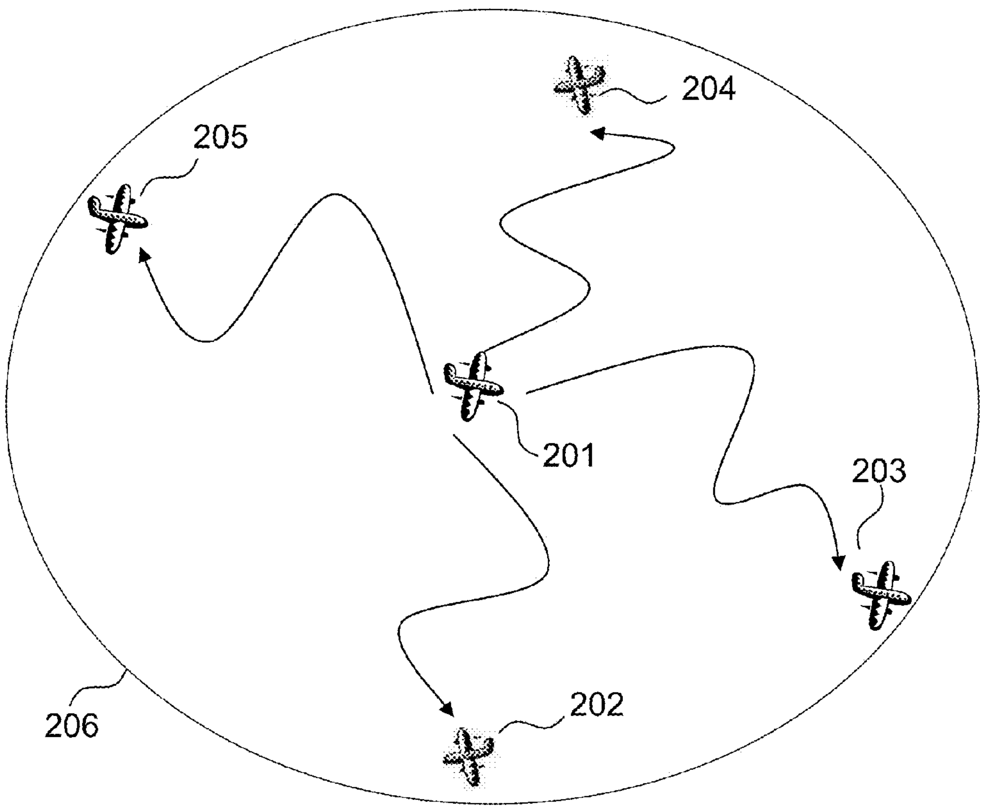
FIG. 2 represents one case of use of the invention.

FIG. 1 represents a diagram of the method according to the invention and FIG. 2 represents a case of use of the invention. The method for assisting in the locating of a first aircraft comprises steps for:

- emission 101 by the first aircraft of an identifier and of a time-stamped position reading,
- reception 102 and storage by at least one second aircraft of the identifier and of the time-stamped position reading, and
- downloading 103 by the second aircraft, after its landing, of the identifiers and of the time-stamped position readings to a database on the ground, in case of disappearance of the first aircraft, determination 104 of the last known position of the first aircraft based on the time-stamped position readings stored in the database on the ground.

The emission step 101 is performed in broadcast mode, that is to say that the information emitted is not intended for one aircraft in particular but for any aircraft present in the area of emission of the first aircraft.

In the example, it can be seen that the area of emission 206 of the first aircraft is of roughly circular shape. Four aircraft, present in this area 206, are likely to receive the information emitted by the first aircraft 201:

an aircraft 205 on the same route, travelling in the same direction and following the first aircraft 201, an aircraft 203 on the same route, travelling in the same direction and preceding the first aircraft 201, and two aircraft 204, 202 on the same route, travelling in the reverse direction and intersecting the first aircraft 201.

In case of disappearance, the last known position of the first aircraft 201 is determined by pooling the position information collected by the second aircraft 202, 203, 204, 205 and by determining the most recent position information.

Advantageously, the locating assistance method also comprises a step for determining the trajectory of the first aircraft 201 based on the time-stamped position readings stored in the database on the ground. This determination is facilitated by storage in the order of reception of the last three time-stamped position readings. These position readings make it possible to determine the line of advance in three dimensions of the aeroplane.

The determined trajectory is particularly relevant if the black boxes have not been retrieved. This trajectory then makes it possible to know the behaviour of the aircraft before its disappearance (change of heading, abrupt loss of altitude, etc).

The invention, although intended to assist emergency services in accident cases in regions with little or no surveillance radar coverage, can remain in place throughout the flight because it does not require very much in the way of resources. The terminal area (TMA) will nevertheless be avoided because of the assured radar coverage and the large number of aircraft such that there is no real benefit in using the invention.

According to a variant of the invention, when a flight of the first aircraft comprises a take-off phase, an in-transit phase and an approach phase, the locating assistance method according to the invention is activated during the in-transit phase and deactivated during the take-off and approach phases.

Figure 3:
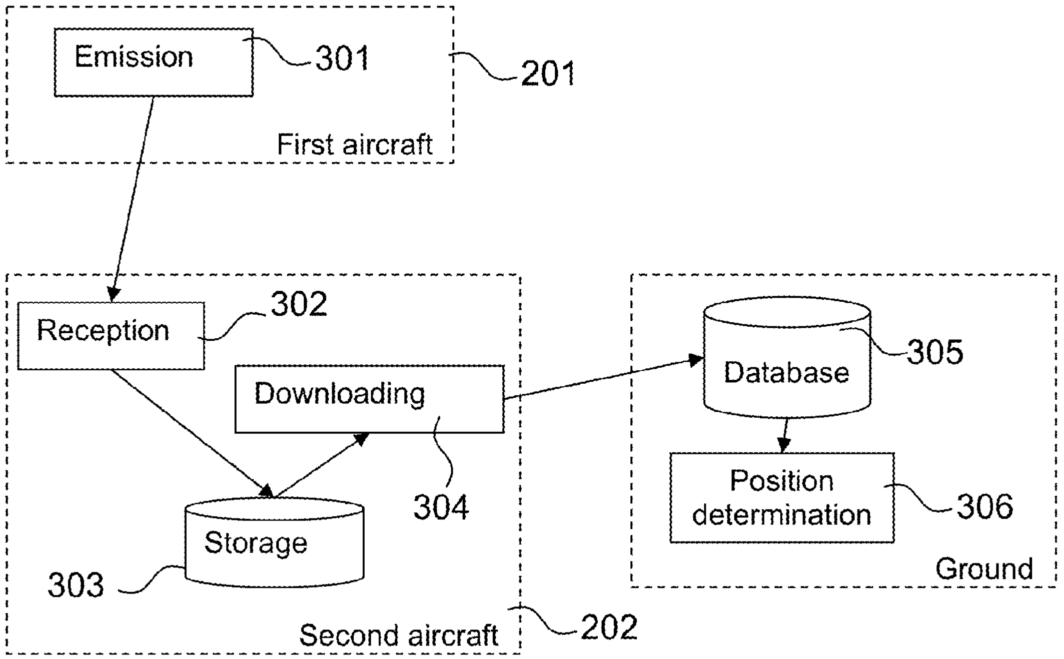
FIG. 3 represents an exemplary embodiment of the device according to the invention.

FIG. 3 represents an exemplary embodiment of the device according to the invention. The device for assisting in the locating of a first aircraft 201 comprises:

means 301, onboard the first aircraft 201, of emitting an identifier and a time-stamped position reading, means 302 for the reception and means 303 for the storage, onboard at least one second aircraft 202, 203, 204, 205, of the identifier and of the time-stamped position reading, and means 304 for the downloading by the second aircraft, after its landing, of the identifiers and of the time-stamped position readings to a database 305 on the ground, means 306 for determining the last known position of the first aircraft, in case of disappearance of said first aircraft, based on the time-stamped position readings stored in the database 305 on the ground.

Storage means onboard aircraft, such as navigation or performance databases, are already known. The invention requires a lower level of criticality than the abovementioned avionics databases. It is therefore possible to implement the invention with dedicated storage means 303 that have a low level of criticality.

Advantageously, the device according to the invention also comprises means for determining the trajectory of the first aircraft on the basis of the time-stamped position readings stored in the database on the ground.

Advantageously, the emission means 301 of the first aircraft 201 are of ADS-B out type.

Advantageously, the reception means 302 of the second aircraft 202 are of ADS-B in type. Thus, the second aircraft is capable of receiving the ADS-B emissions from the first aircraft.

The ADS-B system is a digital link between aircraft. ADS is the acronym for Automatic Dependent Surveillance Broadcast. The ADS-B system enables the aircraft to be identified and to exchange information particularly concerning their position (longitude, latitude, altitude) and their speed.

The frequency of the communications between the aircraft by ADS-B is of the order of a few seconds over a coverage area of 14 to 30 Nm in transit for a transmission via a transponder in mode S. The ADS-B application can be implemented by the transponder for example with the 1090 ES (standing for 1090 Mhz Extended Squitter) and for the United States only with the UAT (standing for Universal Access Transponder).

This makes it possible to determine the last known position of the aircraft which has disappeared with a much greater accuracy than with the methods according to the prior art.

The invention claimed is:

1. A method for assisting in the locating of a first aircraft frequently emitting an identifier and a time-stamped position reading, said method comprising:

reception and storage by at least one second aircraft of the identifier and of the time-stamped position reading, and downloading by the second aircraft, after its landing, of the identifiers and of the time-stamped position readings to a database on the ground, and in case of disappearance of the first aircraft, determination of a last known position of the first aircraft based on the time-stamped position readings stored in the database on the ground.

2. The locating assistance method according to claim 1, further comprising a step for determining a trajectory of the first aircraft based on the time-stamped position readings stored in the database on the ground.

3. The locating assistance method according to claim 1, wherein, a flight of the first aircraft comprising a take-off phase, an in-transit phase and an approach phase, said locating assistance method is activated during the in-transit phase and deactivated during the take-off and approach phases.

4. A device for assisting in the locating of a first aircraft having means onboard the first aircraft of emitting an identifier and a time-stamped position reading, said device comprising:

means for reception and means for storage, onboard a second aircraft, of the identifier and of the time-stamped position reading, and means for downloading by the second aircraft, after its landing, of the identifiers and of the time-stamped position readings to a database on the ground, means for determining a last known position of the first aircraft, in case of disappearance of said first aircraft, on the basis of the time-stamped position readings stored in the database on the ground.

5. The device for assisting in the locating of a first aircraft according to claim 4, further comprising means for determining a trajectory of the first aircraft on the basis of the time-stamped position readings stored in the database on the ground.

6. The device for assisting in the locating of a first aircraft according to claim 4, wherein the emission means of the first aircraft is of ADS-B out type.

7. The device for assisting in the locating of a first aircraft according to claim 4, wherein the reception means of the second aircraft is of ADS-B in type.

* * * * *